(No Model.) 2 Sheets—Sheet 1.
W. C. GEBHARDT.
HOSE OR PIPE COUPLING.
No. 503,282. Patented Aug. 15, 1893.
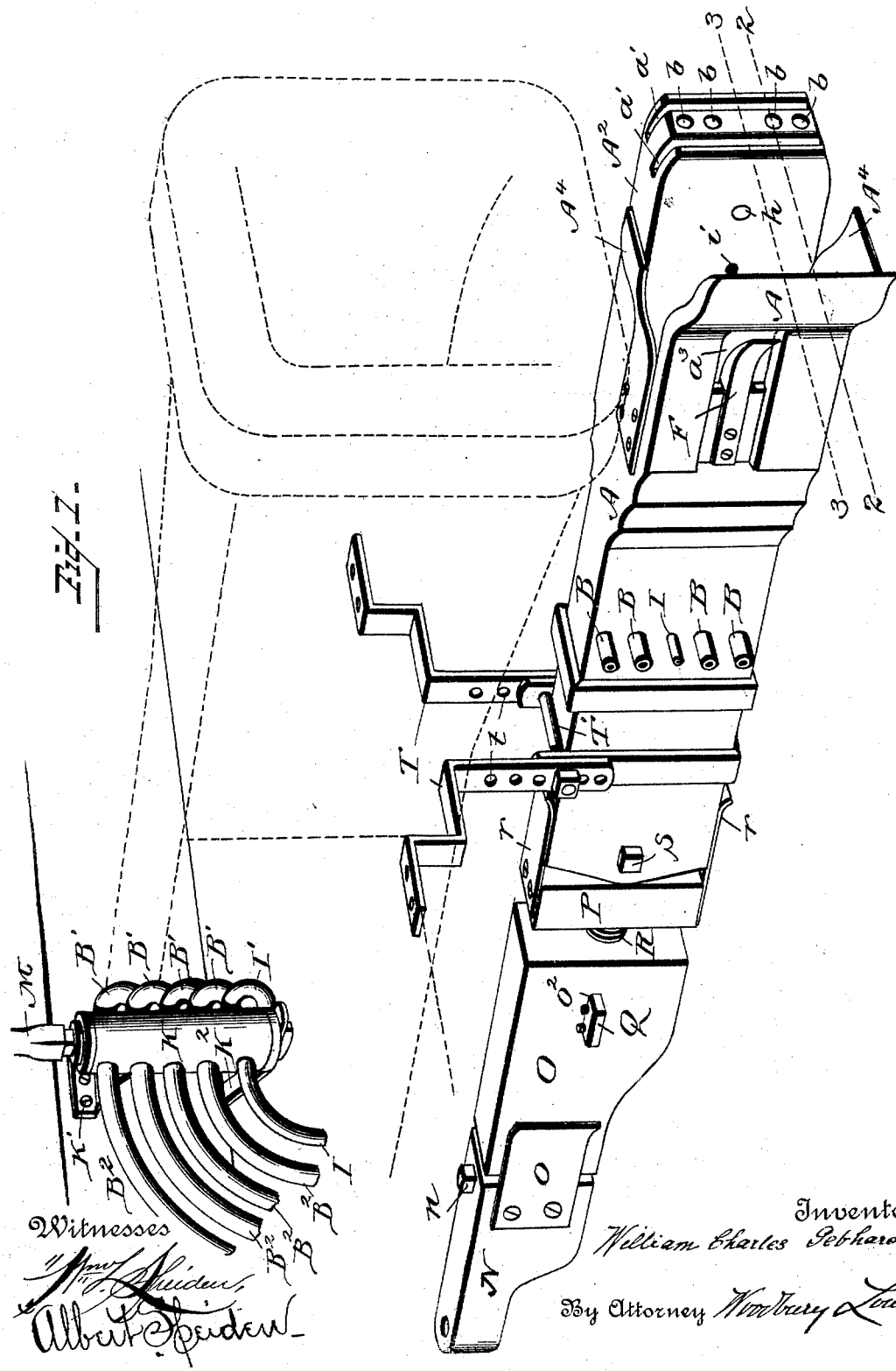

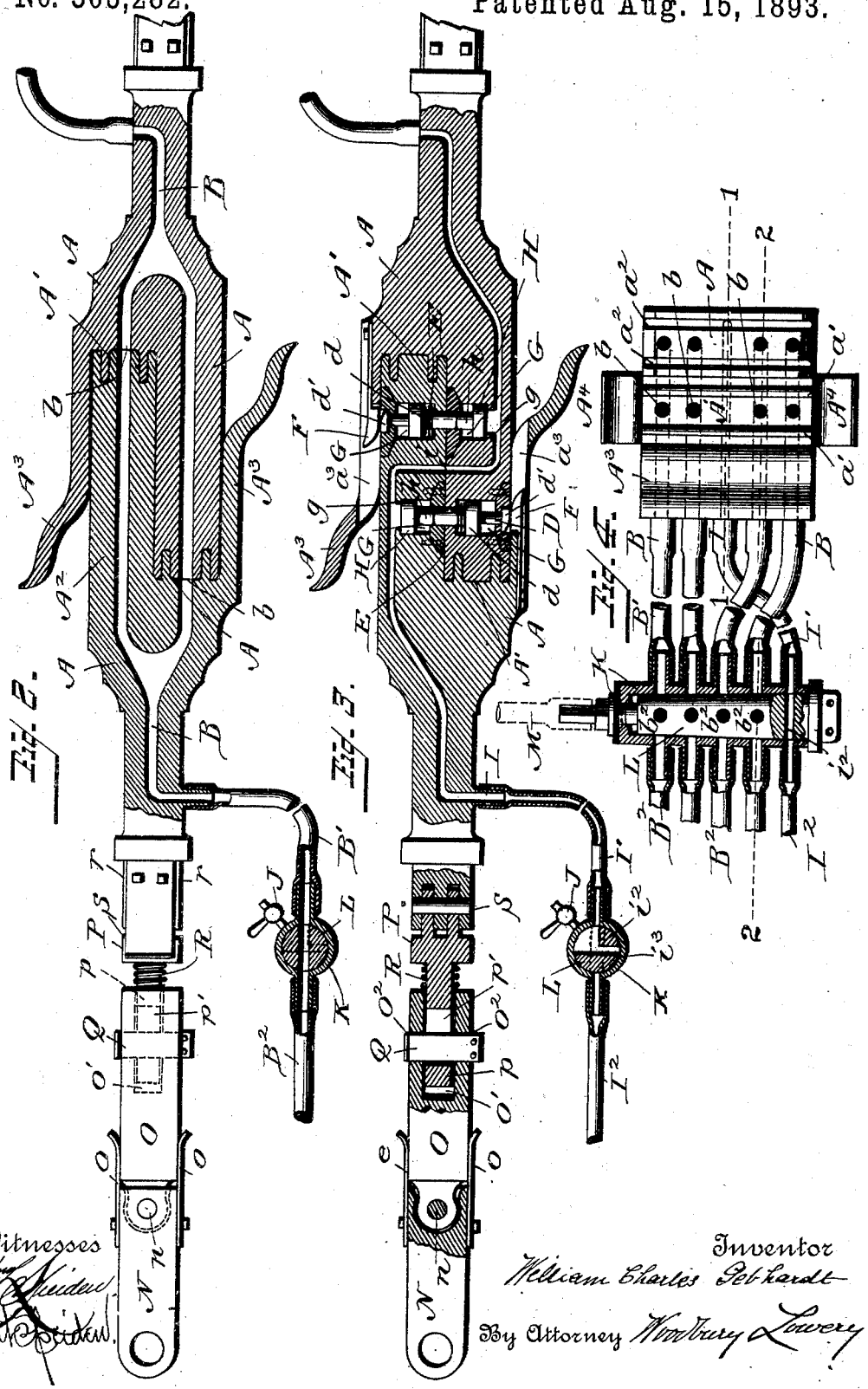

UNITED STATES PATENT OFFICE.

WILLIAM CHARLES GEBHARDT, OF LULING, TEXAS, ASSIGNOR OF ONE-HALF TO OTIS McGAFFEY, JR., OF SAME PLACE.

HOSE OR PIPE COUPLING.

SPECIFICATION forming part of Letters Patent No. 503,282, dated August 15, 1893.

Application filed February 27, 1893. Serial No. 463,822. (No model.)

*To all whom it may concern:*

Be it known that I, WILLIAM CHARLES GEBHARDT, a citizen of the United States, residing at Luling, in the county of Caldwell and State of Texas, have invented new and useful Improvements in Hose or Pipe Couplings, of which the following is a specification.

The object of my invention is to provide an automatic pipe coupling for cars and for other purposes, whereby one or more pipes may be automatically uncoupled by means of steam, air or fluid pressure.

My invention consists of a pair of twin couplers through each of which one or more tubes are conducted, the apertures of which in the face of one coupler register with those in the face of the opposite coupler, each coupler being provided with guides or other suitable means for bringing it into alignment with the other and with a bolt or latch which automatically engages the opposite coupler when they are brought together and is released by steam or other pressure through one of the connecting pipes, in order to uncouple; and it further consists in a valve connection with said coupler pipes whereby the connecting pipe or pipes are closed in the act of uncoupling.

It further consists of a flexible shank connection for the couplers, where it is required that the latter shall have a certain amount of play, as when used on railway cars.

Figure 1 is a view in perspective of a coupler and its valve connection. Fig. 2 is a horizontal cross-section of the same on the line 2—2 of Figs. 1 and 4, showing the pipe connections. Fig. 3 is a similar view on the line 3—3 of Fig. 1 showing the locking and uncoupling mechanism with its pipe connection; and Fig. 4 is an end view of a coupler with its valve connection showing the latter partially in cross section.

A is the coupler head having an interior tongued shoulder A' and a projecting grooved jaw $A^2$ matching the corresponding tongued jaw and grooved shoulder on its twin coupler head.

$a'$ $a'$ are the tongues on the shoulder A' and $a^2$ $a^2$ the grooves on the jaw $A^2$.

$A^3$ is an outwardly flaring lateral guide at the side of said shoulder A', and $A^4$ are corresponding top, and bottom guides located above and below across said shoulder to conduct the matching jaw $A^3$ of its twin coupler head into engagement therewith.

B, B, B, B, are pipes for steam or other purposes extending through the coupling head A, their openings $b$, $b$, $b$, $b$, in the face of the jaw $A^2$ and shoulder A' registering with similar apertures in the matching shoulder A' and jaw $A^2$ of the twin coupler head. The pipes are provided with suitable nozzle couplings in the side of the coupler head. In Figs. 2 and 3 I have shown the pipes as branching in the coupler head to afford two passages through the same, but it is evident that one of the branches may be dispensed with without departing from my invention.

The automatic coupling is effected by the following mechanism, see Fig. 3: Seated in a chamber C extending transversely across the forward end of the jaw $A^2$ is a bolt D having a longitudinal play limited by its piston head $d$ reciprocating in an enlarged recess in said passage, sufficient to project the bolt in turn on either side of the jaw somewhat beyond the vertical walls of the latter. A coiled spring E abutting between the piston head $d$ and the inner end of the recess normally holds the inner locking end of the bolt D flush with the inner side wall of the jaw, the bolt-head $d'$ projecting on the opposite side, when the coupling-head is detached. As the coupling heads A approach, the jaws $A^2$ are guided into place by the guides $A^2$ and $A^4$ on each coupler head acting in conjunction, the projecting bolt-head $d'$ of the bolt D traveling through the slot $a^3$ provided for that purpose in the lateral guide $A^3$, and as the jaw settles into its seat, a spring F secured to the opposite coupler head and lying in the slot $a^3$ of the guide $A^3$ in the path of the bolt slides over the beveled bolt head $d'$ and overcoming the tension of the coiled spring E presses the bolt D inward until its locking end engages in the passage G provided in the face of the adjacent coupler head jaw, locking the two together.

I uncouple the device by the following means: When the bolt D is thrust into the passage G it lifts the spindle $h$ of the piston H, located in an enlarged chamber in the passage G on the same axial line with the bolt D and chamber C until the piston H bears against the offsets $g$ $g$ at the end of the chamber. A pipe I connected outside of the coupler head to a source of pressure communicates with the chamber G above the piston head and extends beyond it to an aperture $i$ in the inside lateral wall of the jaw A' where it registers with a similar aperture and pipe in the adjacent jaw. On applying steam or other pressure through the pipe I, the piston H is depressed expelling the locking bolt D against the stress of the locking spring F, until the end of the spindle $h$ and the locking end of the bolt D are each flush with the inner walls of their respective jaws. The coupler heads can now be separated; and the locking bolt D escaping from beneath its spring F, is maintained in position by its coiled spring E ready for the next coupling. The same operation is repeated simultaneously in the adjacent twin coupling head, when the latter is also provided with a locking bolt, by means of the communicating tube I which connects with mechanism identical with that already described, as indicated in the drawings by similar letters.

K is the case of the uncoupling valve mounted in any convenient locality. In Fig. 1 I have shown it attached to the end of a car at the side of the drawhead in connection with the pipe coupling on the car. It is secured in place by means of the bracket K' forming part of the case and the brace $K^2$ or in any other suitable way. The case K is provided with the flexible entrance tubes B' I' and exit tubes $B^2$ and $I^2$ communicating respectively with the tubes B and the uncoupling pressure tube I of the coupler head.

L is the valve spindle having the ports $b^2$ corresponding to the tubes B' of the case, and at right angles thereto the port $i^2$ corresponding to the pressure tube I, so that when the latter is closed the tubes B' $B^2$, B are open, and when the port $i^2$ is open to operate the uncoupling, the ports $b^2$ are closed.

$i^3$ is an enlargement of the port to release the air out of the couplings when they are coupled, and J is a cock releasing the steam out of the connections when coupled, if required.

The top $l$ of the spindle L may be squared off to fit the valve rod M by which it is controlled, or may be operated by any other suitable means. It follows that on turning on the steam or other pressure through the valve port $i^2$ and tubes $I^2$ I, to uncouple the coupler, the communication between the latter and the pipes B' is cut off, and that on turning off the steam when coupled, it is opened. It is evident that each pipe may be operated by an independent valve in place of the single valve K, if required, but the particular advantage presented by the single valve, is the convenience with which it can be located in any accessible place where all the pipe connections can be easily reached in case of necessity.

In the drawings I have shown the steam passage for uncoupling as of less diameter than the other pipe connections, but I do not consider this essential to its operation, neither do I confine myself to the particular description of valve shown in the drawings.

To give the requisite flexibility to my pipe coupling when in use on a car I provide a shank to which the coupler head is hinged constructed to permit of lateral and vertical movement as well as of a limited longitudinal play.

N is a bar pivoted to the bottom of the car to which is hinged at $n$ a link O having a limited horizontal play about its hinge. Spring plates $o$ $o$ secured to the bar N on each side of the hinge hold the link O normally straight. Into the tubular end $o'$ of the link fits the spindle $p$ of the arm P where it is secured by a bolt Q passing through slots $o^2$ $o^2$ in the link, and a longitudinal slot $p'$ in the arm P allowing the latter a certain longitudinal play in its seat. A coiled spring R surrounds the spindle $p$ abutting against the shoulder of the arm P and the end of the link O. The other extremity of the arm P is hinged at $s$ to the end of the coupler head A so as to admit of a vertical play to the latter which is normally maintained in line with the shank by means of the flat springs $r$ secured to the arm P above and below the hinge.

In order to make a sure coupling, the coupler head projects about two inches beyond the drawhead, the slack being taken up by the longitudinal play of the spindle $p$ and its spring R.

I also find it advantageous to suspend the coupler head A far enough below the drawhead to prevent any interference with the latter. This I accomplish by means of the adjustable stirrup T (see Fig. 1) secured to the car bottom on each side of the drawhead and depending below the latter, in which the coupler head A is suspended and is vertically adjustable by means of the pin T' and the apertures $t$ in the stirrup.

I do not limit myself to the particular form of the coupling or of the locking mechanism, as the essence of this part of my invention consists in a locking device actuated by steam or other pressure in which the operative mechanism is contained in the interior of the coupling. Neither do I limit myself to the particular details of the coupling head or valve, as it is evident that the same may be greatly varied without departing from the spirit of my invention. I thus produce a compact and efficient hose coupler, having practically no exposed exterior or projecting parts beyond the nozzles to connect the hose to coupler. All of its mechanism is thus protected from grit and dirt. The pipes conducted through the interior of the device are not unnecessarily exposed to heat and cold, register at once without complicated apparatus and are all controlled together at one operation.

Having thus described my invention, what I claim as new, and desire to secure by Letters Patent, is—

1. The combination with an automatic hose coupling of a conduit for gas or fluid pressure connecting through said hose coupling and a locking device released by gas or fluid pressure connected to said conduit, both conduit and locking device inclosed within said coupling, substantially as described.

2. In an automatic hose coupling having matching parts, the combination with an inclosed conduit connecting said hose through said parts, of a locking bolt or piston inclosed within one part and in communication with said conduit in the other part, as described.

3. In an automatic coupling consisting of intermatching parts, a registering steam channel within each part, in combination with a communicating chamber containing a releasing piston released by steam or other fluid pressure within one coupling part, and a spring sustained locking bolt within the other part, substantially as described.

4. In an automatic hose or pipe coupling having matching jaws, the combination with an automatic locking device inclosed within one matching jaw, of means inclosed within the other matching jaw for releasing said locking device by steam or other pressure, substantially as described.

5. In an automatic hose or pipe coupling having matching jaws, a matching jaw having a locking device located therein and adapted to lock with the opposite jaw and a steam operated releasing device similarly located and adapted to release the locking device of the opposite jaw, substantially as described.

6. In an automatic hose or pipe coupling having matching jaws, a matching jaw having an automatic locking bolt located therein and adapted to be depressed by and locked into the opposite jaw, a spring adapted to engage with, depress and lock the bolt on the opposite jaw, and a steam operated releasing device similarly located within the jaw and adapted to release the locking bolt of the opposite jaw, substantially as described.

7. In an automatic hose or pipe coupling, having two coupler heads, the combination with the coupler head having parts constructed to match with the twin coupler and inclosed pipe communication therethrough, and an inclosed automatic locking device, of means on the other coupler head to release the locking device by steam or other fluid pressure.

8. The combination with an automatic hose or pipe coupling adapted to couple a series of pipes and having an uncoupling device actuated by steam or fluid pressure, of a valve having suitable hose connections with the coupler pipes and the uncoupling device, said valve being adapted to close the coupling pipes when it opens the uncoupling pipe, and vice versa, substantially as described.

9. In an automatic hose or pipe coupling, the combination with a coupler head having a jaw and shoulder, with inclosed pipe communication therethrough, adapted to match with the twin coupler head, of an automatic inclosed locking device released by steam or fluid pressure and connected with an inclosed pipe inclosed within said jaw and adapted to lock with said twin coupler jaw, substantially as described.

10. In an automatic hose or pipe coupling, the combination with a coupler head having a jaw and a shoulder with inclosed pipe communication therethrough, adapted to match with its twin coupler head, of an automatic locking device located within said jaw and adapted to lock with said twin coupler jaw, a steam pressure operated unlocking device similarly located for releasing the locking device on said twin coupler jaw, and suitable inclosed pipe communication therewith, substantially as described.

11. In an automatic hose or pipe coupling having twin coupler heads, the combination with the coupler head A having the shoulder A' and the jaw A² provided with the passages B, the bolt D located in the transverse passage C of the jaw, its spring E located in an enlargement in said chamber between the piston $d$ of the bolt and the end of the chamber, of the twin coupler head A³ having the matching jaw and shoulder provided with similar passages, a recess in the jaw to engage with the bolt D, the slotted guide A³ and the locking spring F lying in the path of the bolt D and adapted to ride over and lock the same, substantially as described.

12. In an automatic pipe or hose coupling having twin coupler heads, the combination with the coupler head A having the shoulder A' and the jaw A² provided with the passages B, the locking bolt D located in the transverse passage C of the jaw, its spring E located in an enlargement in said chamber between the piston head $d$ and the end of the chamber, of the twin coupler head having the matching jaw and shoulder provided with similar passages, the unlocking piston H and spindle $h$ located in the transverse chamber G in the jaw on the same axial line with the locking bolt, the slotted guide A³, the locking spring F lying in the path of the bolt and adapted to ride over and lock it and the pipe connection I through said coupler heads with said unlocking piston H, substantially as described.

13. The combination with a hose or pipe coupling having matching twin coupler heads, of the coupler head A having the shoulder A' and the jaw A² provided with the passages B, the locking bolt D located in the transverse passage C of the jaw, its spring E located in the enlargement of the passage C as described, the unlocking piston H and the spindle $h$ located in the transverse chamber G in the jaw, the slotted guide $A^3$, the locking spring F lying in said slot, the pipe connection I with said unlocking piston H, and the top and bottom guides $A^4$, substantially as described.

14. The combination with a hose or pipe coupling having matching twin coupler heads, of the coupler head A having the shoulder A' and the jaw $A^2$ provided with the passages B, the locking bolt D located in the transverse passage C in the jaw, its spring E located in the enlargement of the passage C as described, the unlocking piston H and the spindle $h$ located in the transverse passage G in the jaw, the pipe connection I with said unlocking piston H, the slotted guide $A^3$, the locking spring F lying in said slot, the top and bottom guides $A^4$, the valve case K having the entrance and exit ports B' $B^2$ I' $I^2$, its spindle K' having the ports $b^2$ $i^3$ as described, the cock J, suitable flexible pipe connection between the exit ports and the coupler head tubes, and means to operate the valve, substantially as described.

15. The combination with an automatic hose coupler, of the flexible shank having the pivoted bar N the link O hinged thereto and adapted to swing in one direction, the arm P having the spindle $p$ sliding longitudinally in the tubular end $o'$ of the link O and secured in place by the bolt Q through the slots $o^2$ $o^2$ and the slot $p'$ in the spindle, the spring R located between the end of the link O and the shoulder of the arm P, the hose or pipe coupler head A hinged to said arm P and adapted to swing in the other direction, and the flat springs $o$ $o$ $r$ $r$, on each side of said hinges, substantially as described In testimony whereof I have hereunto set my hand in the presence of two subscribing witnesses.

WILLIAM CHARLES GEBHARDT.

Witnesses:
E. F. BARNHILL,
CHARLES JAMES BUTFIELD.